F. M. LEWIS.
DIFFERENTIAL MECHANISM.
APPLICATION FILED SEPT. 6, 1921.
1,430,744.
Patented Oct. 3, 1922.
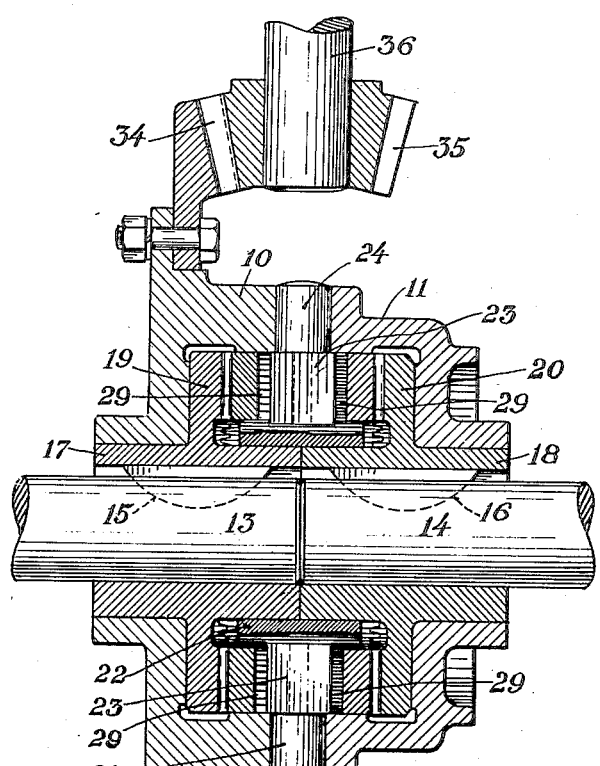
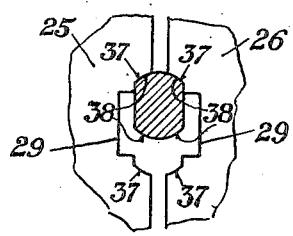
Inventor:
Frank M. Lewis
By: Samuel N. Pond
Atty.

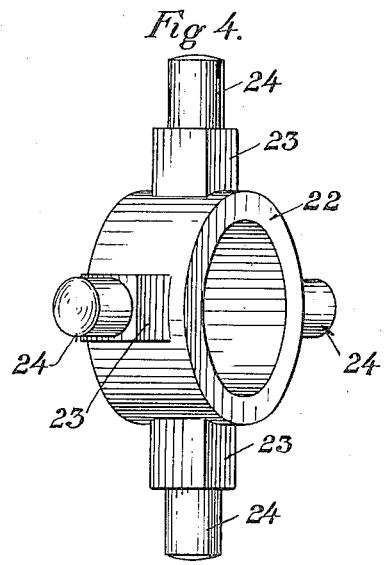
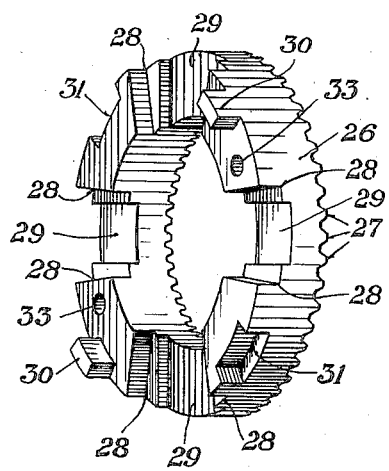
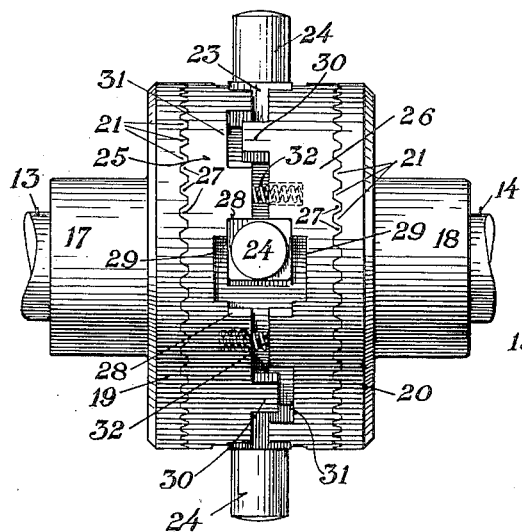
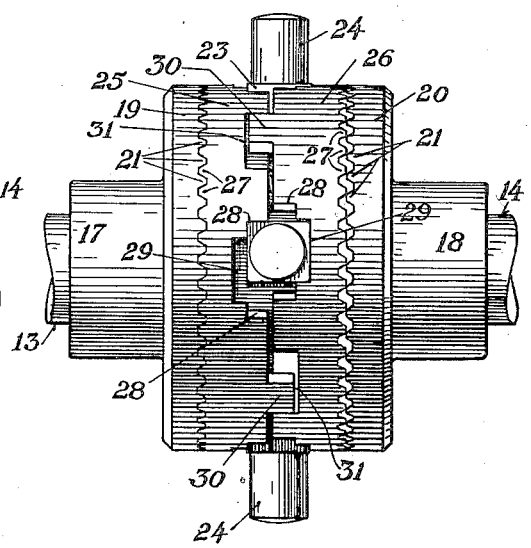

F. M. LEWIS.
DIFFERENTIAL MECHANISM.
APPLICATION FILED SEPT. 6, 1921.
1,430,744.
Patented Oct. 3, 1922.
3 SHEETS—SHEET 3.
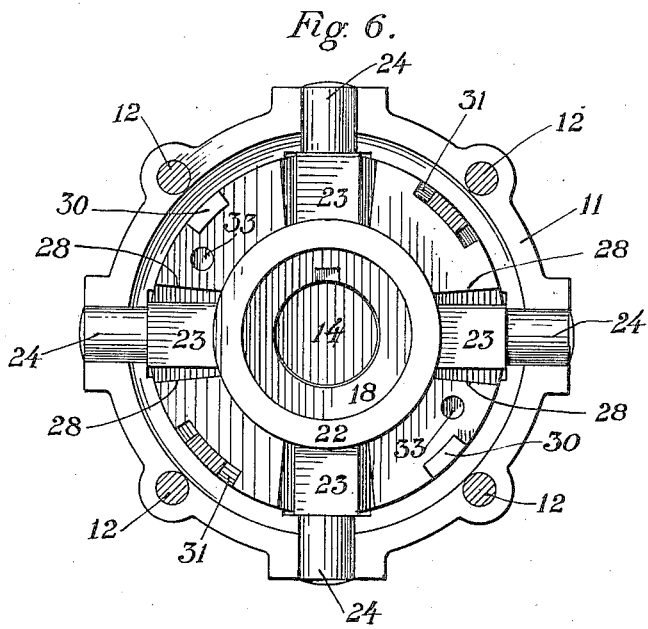
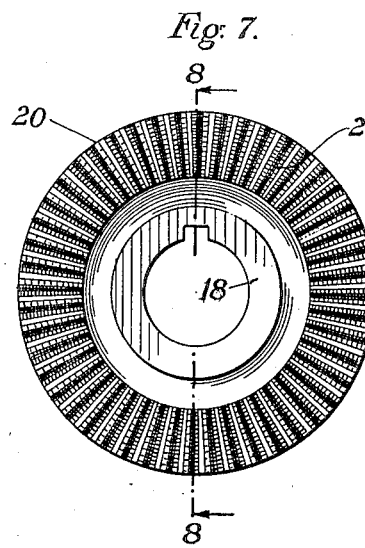
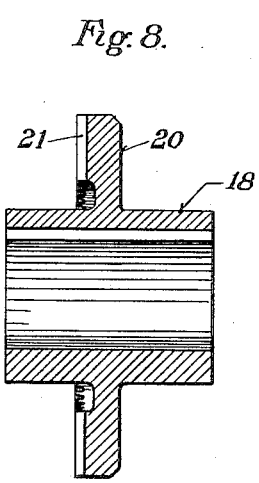
Inventor:
Frank M. Lewis
By: Samuel N. Pond
Atty Patented Oct. 3, 1922.

1,430,744

UNITED STATES PATENT OFFICE.

FRANK M. LEWIS, OF CHICAGO, ILLINOIS.

DIFFERENTIAL MECHANISM.

Application filed September 6, 1921. Serial No. 498,746.

*To all whom it may concern:*

Be it known that I, FRANK M. LEWIS, a citizen of the United States, residing at Chicago, in the county of Cook and State of Illinois, have invented certain new and useful Improvements in Differential Mechanism, of which the following is a specification.

This invention relates to differential mechanism; and has reference more particularly to differential mechanism of the general type disclosed in Letters Patent No. 1,292,818, granted to me January 28, 1919. The mechanism of the aforesaid patent, generally described, comprises a pair of toothed clutch members fast on the inner ends of a pair of axle sections, a pair of laterally shiftable intermediate clutch members having clutch teeth on their outer sides drivingly engaged with the clutch teeth of the first-named clutch members and formed with pairs of mating cam recesses on their inner sides, a rotatable housing, and a driver in the form of a spider having radial studs lying between the mating cam recesses of the shiftable clutch members, with a provision for limited relative rotation of said shiftable clutch members so as to permit either shaft section to run ahead of the other without interfering with the continuous drive of the slower running shaft section. In the practical application of this device to motor vehicles it has been found that occasionally, where the recess cams are steep, under severe driving strain the cam thrust of the driven clutch member, caused by the load, acting upon the laterally shiftable driving clutch member engaged therewith, is greater than the opposite acting cam thrust of the radial studs of the driver acting upon the sides of the cam recesses of said shiftable driving clutch member, whereby the latter is thrown out of driving engagement, and the device thus fails to function properly. On the other hand, where the recess cams are low, there is an objectionable amount of lost motion.

The chief object of the present invention is to provide a differential gearing embodying the broad principle of my aforesaid patent, but eliminating the faults of operation above noted, and this object is attained chiefly through a novel alteration in the forms of mating recesses on the inner sides of the shiftable clutch members and of the portions of the driver studs which cooperate therewith whereby the cam action, with its possibility of back-slip, is dispensed with, and a positive lock is provided which effectively prevents any possibility of the shiftable driving clutch member being forced back out of engagement with its cooperating driven clutch member under severe driving strains, and at the same time the amount of lost motion is reduced to a minimum.

Other objects and attendant advantages of the invention will be apparent to those skilled in the art from a consideration of the following description, taken in connection with the accompanying drawings, wherein I have illustrated a practical and approved embodiment of the invention, and in which—

Fig. 1 is an axial section of my improved differential mechanism;

Fig. 2 is an elevation of the same, with the rotatable housing omitted, and showing the parts in normal running position, wherein both axle sections are driven;

Fig. 3 is a view similar to Fig. 2, but showing the relative positions of the parts when the right hand axle is running at a greater speed than the left hand axle.

Fig. 4 is a perspective elevation of the driver spider;

Fig. 5 is a perspective elevation, viewed from its inner side, of the right hand shiftable clutch member; it being understood that the mating left hand shiftable clutch member embodies the same construction;

Fig. 6 is a substantially central transverse section through the gearing;

Fig. 7 is an inner face view of one of the driven clutch members that is keyed to the axle section;

Fig. 8 is a vertical section taken on the line 8—8 of Fig. 7; and

Fig. 9 is a fragmentary detail view illustrating a slight modification in the forms of the recesses and studs.

Referring to the drawings, 10 and 11 designate cooperating halves of a rotatable housing, united by bolts 12 (Fig. 6) and enclosing the principal cooperating parts of the differential gear. Into opposite ends of this housing are entered the two axle sections 13 and 14. On the latter are secured, as by keys 15 and 16 the hubs 17 and 18 of a pair of outer driven members 19 and 20, which latter are formed on their inner sides with radial clutch teeth 21. In the construction shown, the outer ends of the hubs 17 and 18 constitute bearings for the rotatable housing.

On the inner portions of the hubs 17 and 18 is rotatably mounted the relatively long hub 22 of a driver spider, the hub 22 serving to maintain the hubs 17 and 18 and the shaft sections 13 and 14 in accurate axial alinement. In the instance shown the driver spider has four radial arms, each arm comprising an inner squared portion 23 and an outer round portion 24, which latter, as clearly shown in Figs. 1 and 6, is rigidly mounted in and between the mating sections 10 and 11 of the rotatable housing.

Between this driver spider and the driven clutch members 19 and 20 are located a pair of driving clutch members 25 and 26, one of which, (26) is illustrated in perspective elevation in Fig. 5; it being understood that the companion member 25 embodies the same construction reversed as to position. Each of these members takes the form of an annulus, the outer periphery of which has a free running fit on the inner wall of the rotatable housing, while its inner periphery has a similar running fit on the hub 22 of the spider. On the outer side of each of these members is a ring of radial clutch teeth 27, adapted to interfit and cooperate with the clutch teeth of the driven members 19 and 20. On the inner side of each of the shiftable members 25 and 26 are formed recesses corresponding in number to the radial arms of the spider. Each of these recesses has substantially rectangular end portions 28 and an intermediate central countersunk portion 29. As clearly shown in Figs. 2 and 3, the mating recesses on the two shiftable members embrace the squared portions 23 of the studs of the spider.

The two members 25 and 26 are interkeyed for limited relative rotary movement by means of a pair of inwardly projecting lugs 30 on each member engaged with slots or notches 31 of the other member, the length of the slots or notches exceeding the width of the studs to the extent of the relative rotation of the members 25 and 26 necessary to effect the functioning of the mechanism as hereinafter described. The two members 25 and 26 are normally urged apart and into driving engagement with the clutch members 19 and 20 by means of coil compression springs 32 seated in sockets 33 on the inner face of each member and at their outer ends slidably abutting against plane surfaces on the inner side of the other member; two of the four springs shown being preferably carried by each member.

To the member 10 of the housing is attached the usual bevel gear 34 engaged and driven by a bevel pinion 35 on the inner end of the transmission shaft 36.

Fig. 2 shows the relative positions of the parts under a normal forward drive. The two driving clutches 25 and 26 have been forced into engagement with the driven clutches 19 and 20 by the springs 32, and the squared portions 23 of the driver studs are engaged with the rectangular end portions 28 of the recesses. The rotary movement of the housing and spider is thus directly transmitted through the studs to the shiftable clutch members 25 and 26, by them to the driven clutch members 19 and 20, and by them to the axle sections 13 and 14.

When one wheel, as, for instance, the right hand wheel of Figs. 2 and 3, runs ahead, the clutch member 20 overruns its driver 26, thereby shifting the latter in advance of the driver clutch 25 until the countersunk portions 29 of its recesses come opposite and into register with the squared portions 23 of the studs, whereupon the teeth of the clutch member 20 instantly cam the clutch member 26 inwardly to the position shown in Fig. 3, which allows the right hand wheel to overrun. As soon as the right hand wheel ceases to overrun its driving clutch 26, it no longer holds the latter disengaged, and the springs act to force the clutch 26 back into driving engagement with the clutch member 20, the parts automatically returning to the relative positions shown in Fig. 2.

Now, it will be noted, that during differential running shown in Fig. 3, when the entire power of the motor is applied to the slower running wheel on the left, the rectangular corners of the studs, which are drivingly engaged with the forward rectangular ends 28 of the recesses, serve as a positive lock to prevent the possibility of the teeth of the clutch 19 camming the member 25 out of driving engagement. There can thus arise no slip and lost power due to disengagement of the driving and driven members on account of a cam thrust tending to separate them.

Fig. 9 illustrates a slight modification in the form of the cooperating studs and recesses, wherein the extreme end walls of the recesses, instead of being flat and at right angles to the direction of rotation are inclined to the latter, as shown at 37, and the forward and rear sides of the studs which engage therewith are correspondingly inclined, as shown at 38. By reason of this construction, the driving thrust of the studs assists the springs 32 in holding the shiftable clutch members 25 and 26 in driving engagement with the driven clutch members 19 and 20. This construction, however, retains the locking feature consisting of cooperating walls on the studs and recesses which are parallel with the plane of rotation and at right angles to the axis of the shiftable members.

I claim:

1. In a differential mechanism, the combination of a rotatable housing, axle sections entered within the opposite ends of said housing, driven members fast on said axle sections and formed with clutch teeth on their inner sides, shiftable members between said driven members, each having clutch teeth on its outer side and recesses on its inner side, a driver between said shiftable members connected to said rotatable housing and having radial studs disposed between mating recesses of said shiftable members, said studs and recesses being formed with cooperating walls which serve to lock said shiftable members against disengagement from said driven members while in driving engagement with the latter, and means urging said shiftable members into clutch engagement with said driven members.

2. In a differential mechanism, the combination of a rotatable housing, axle sections entered within the opposite ends of said housing, driven members fast on said axle sections and formed with radial clutch teeth on their inner sides, laterally shiftable members between said driven members, each having radial clutch teeth on its outer side and recesses on its inner side, a driver spider between said shiftable members having radial studs disposed between mating recesses of said shiftable members and at their outer ends connected to said housing, said studs and recesses being formed with cooperating walls which serve to lock said shiftable members against disengagement from said driven members while in driving engagement with the latter, means urging said shiftable members into clutch engagement with said driven members, and means for limiting relative rotary movement of said shiftable members.

3. In a differential mechanism, the combination of a rotatable housing, axle sections entered within the opposite ends of said housing, driven members fast on said axle sections and formed with clutch teeth on their inner sides, shiftable members between said driven members, each having clutch teeth on its outer side and rectangular recesses on its inner side, each of said recesses having an intermediate countersunk portion, a driver between said shiftable members connected to said rotatable housing and having radial studs disposed between mating recesses of said shiftable members, and spring means between said shiftable members urging the latter into clutch engagement with said driven members.

4. In a differential mechanism, the combination of a rotatable housing, axle sections entered within the opposite ends of said housing, driven members fast on said axle sections and formed with clutch teeth on their inner sides, laterally shiftable members between said driven members, each having clutch teeth on its outer side and rectangular recesses on its inner side, each of said recesses having an intermediate countersunk portion, a driver between said shiftable members connected to said rotatable housing and having radial studs disposed between mating recesses of said shiftable members, springs between said shiftable members urging the latter into clutch engagement with said driven members, and means for limiting relative rotary movement of said shiftable members.

5. In a differential mechanism, the combination of a rotatable housing, axle sections entered within the opposite ends of said housing, driven members fast on said axle sections and formed with clutch teeth on their inner sides, shiftable members between said driven members, each having clutch teeth on its outer side and recesses on its inner side, each of said recesses having rectangular end portions and an intermediate countersunk portion, a driven spider between said shiftable members connected to said rotatable housing and having radial studs formed with squared portions disposed between mating recesses of said shiftable members, and means urging said shiftable members into clutch engagement with said driven members.

6. In a differential mechanism, the combination of a rotatable housing, axle sections entered within the opposite ends of said housing, driven members fast on said axle sections and formed with clutch teeth on their inner sides, laterally shiftable members between said driven members, each having clutch teeth on its outer side and recesses on its inner side, each of said recesses having rectangular end portions and an intermediate countersunk portion, a driver spider between said shiftable members having radial studs connected at their outer ends to said housing and formed with squared portions disposed between mating recesses of said shiftable members, springs between said shiftable members urging the latter into clutch engagement with said driven members, and cooperating lugs and slots on the inner opposed faces of said shiftable members serving to limit relative rotary movement of the latter.

FRANK M. LEWIS.